3,381,028
METHOD OF REMOVING POTASSIUM IONS FROM HYDROXYALKYL ALKYL MALEATES
William R. Davie, Hopewell Township, Beaver County, Pa., assignor to United States Steel Corporation, a corporation of Delaware
No Drawing. Filed Sept. 24, 1965, Ser. No. 490,101
7 Claims. (Cl. 260—485)

This invention relates to an improved method of removing potassium ions from hydroxyalkyl alkyl maleates.

Hydroxyalkyl alkyl maleates are monomers which copolymerize with vinyl monomers, such as styrene, acrylates, methacrylates or vinyl acetate, to produce a copolymer with a pendant reactive hydroxyl group. When this copolymer is heated with a thermosetting resin, such as melamine-formaldehyde or urea-formaldehyde, the hydroxyl group is crosslinked to the thermoset resin. The resulting product is useful as a protective coating.

Hydroxyalkyl alkyl maleates have the structural formula:

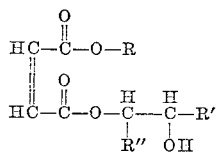

R may be an alkyl group ranging from methyl to decyl or even higher; both R' and R" may be hydrogen, or one but not both may be a methyl group. These compounds can be prepared by adding alkylene oxides to monoalkyl maleates in the presence of a catalyst. Commonly an excess of the alkylene oxide is added slowly to the monoalkyl maleate, and the mixture heated for about four hours at a temperature of about 70° C. The operation can be conducted under pressure if the alkylene oxide is one which vaporizes at atmospheric pressure. Subsequently the resulting hydroxyalkyl alkyl maleate is stripped of excess alkylene oxide under vacuum. Perhaps the most widely used compound of this class is hydroxypropyl butyl maleate (hereinafter referred to as "HPBM") which may be prepared with propylene oxide and monobutyl maleate. Other examples of such compounds are hydroxyethyl butyl maleate, hydroxypropyl octyl maleate, hydroxyethyl octyl maleate, hydroxypropyl methyl maleate, etc.

The best catalyst I known of for preparing hydroxyalkyl alkyl maleates is potassium hydroxide, which may be used in quantities of about 0.5 percent based on the weight of monoalkyl maleate. However, the resulting compound retains an undesirably high concentration of potassium ions (about 2600 parts per million). When the compound stands for a period at room temperature or is heat-aged, a high concentration of potassium ions causes a sediment to form (presumably a potassium maleate salt). Potassium ions also catalyze the formation of small amounts of bis maleate, which causes gelling of the product when copolymerization with a vinyl monomer is attempted. A gelled copolymer is useless. It has been difficult to remove potassium ions to the extent necessary to prevent this formation of bis maleate. Washing with water is impractical because water is highly soluble in hydroxyalkyl maleates and the latter likewise are highly soluble in water. Conventional ion exchange resins (either strong acid or weak acid types) are ineffective. In either column or batch treatment they lower the potassium ion content only to about 1600 p.p.m., which is still too high.

An object of the present invention is to provide an improved method of lowering the concentration of potassium ions in hydroxyalkyl alkyl maleates to an extent that avoids previous difficulties.

A more specific object is to provide a method of lowering the concentration of potassium ions in the foregoing compounds in which the compound is treated with a solid substantially insoluble acid of the group consisting of silicic acid and terephthalic acid, whereby the resulting product has a sufficiently low content of potassium ions that it does not readily gel.

According to my invention I prepare a hydroxyalkyl alkyl maleate, such as HPBM, in the usual way already described. The resulting compound contains about 2600 p.p.m. of potassium ions. I add to this compound a solid substantially insoluble acid of the group consisting of silicic acid and terephthalic acid in finely divided form powder or granules). I may include the acid in a range of about 1 to 10 percent by weight, but I prefer about 3.5 to 5 percent. If silicic acid is used, it should be a high grade material which contains a maximum of about 3 percent alkali metal and alkaline earth metal ions, or preferably less than 0.1 percent of such ions. Technical grades, which contain up to about 7 percent of such ions, are not satisfactory, nor is silica gel. If terephthalic acid is used, the crude commercial grade, which contains 10 to 15 percent of the more soluble isophthalic acid, is not quite as effective as a purer grade, but may be preferred because of its lower cost. I agitate the mixture of hydroxyalkyl alkyl maleate and solid acid for at least a half hour at a temperature of at least about 70° C. This treatment removes 75 percent or more of the potassium ions. The treatment must not be too prolonged or at too high a temperature, or bis-maleate may form.

As specific examples to demonstrate how my invention operates, I treated a series of HPBM samples batchwise with 3½ percent by weight of treating agent (silicic acid, terephthalic acid or ion exchange resin), 1 percent by weight of activated carbon to improve the color, and 3 percent by weight of diatomaceous earth as a filtering aid. I stirred the samples well during treatment and held them at 70° C. for one hour, then 90° C. for another hour. I filtered the samples hot under vacuum and then refiltered them cool by gravity to remove residual carbon. After the samples were heat aged at 105° C. for 16 hours, I observed the samples for sediment, analyzed them for potassium ion content, and conducted a gel test on each. In the gel test I made up a mixture as follows:

|  | G. |
|---|---|
| Monomer to be tested | 10 |
| Vinyl acetate | 90 |
| Ethyl acetate | 100 |
| Benzoyl peroxide | 1 |

I refluxed this mixture for four hours. The monomer passed the test if no noticeable gel formed in this period of time. The results were as follows:

cent alkali metal and alkaline earth metal ions, and terephthalic acid, and filtering the mixture.

| Treatment | Percent Agent | Sediment After Heating | Gel Test | PPM K+ |
|---|---|---|---|---|
| Untreated Control | None | Much | Fail | 2,599 |
| Amberlite IRC-50-CP (carboxy type ion exchange resin) | 3½ | do | do | 1,118 |
| Amberlite IR-120 (acid form of strong acid type ion exchange resin) | 3½ | do | do | 1,952 |
| Amberlite IRC-50-CP | Column | Slight | do | 1,556 |
| Amberlite IR-120 | Column | Much | do | 1,641 |
| Silicic Acid Hi-Sil 223 (3.5% metal oxides and salts) | 3½ | Moderate | do | 1,259 |
| Silicic Acid Hi-Sil 404 (about 8% metal oxides and salts) | 3½ | Much | do | 1,584 |
| Silica Gel (28–200 Mesh) | 3½ | do | do | 1,658 |
| Silicic Acid SiO₂×H₂O (less than 0.1% metal oxides and salts—loss on ignition 12%) | 3½ | Slight | Pass | 452 |
| Silicic Acid SiO₂×H₂O (less than 0.1% metal oxides and salts—loss on ignition 20%) | 3½ | do | do | 582 |
| Terephthalic Acid | 3½ | None | do | 66 |
| Terephthalic Acid TA-12 (10–15% isophthalic acid) | 3½ | do | do | 81 |

I observed similar results in purifying other hydroxyalkyl alkyl maleates by the same procedure. In each instance treatment with silicic acid of the proper grade or terephthalic acid lowered the potassium ion concentration to a sufficient extent that the product was essentially free of sediment after heat aging and passed the gel test while treatment with the other agents failed.

While I have described only certain preferred ways of practicing the invention, it is apparent other modifications may arise. Therefore I do not wish to be limited by the disclosure set forth, but only by the scope of the appended claims.

I claim:
1. A method of removing potassium ions from hydroxyalkyl alkyl maleates prepared by adding an alkylene oxide to a monoalkyl maleate in the presence of potassium hydroxide as a catalyst, said method comprising mixing 1 to 10 percent by weight of a solid substantially insoluble acid in finely divided form with the hydroxyalkyl alkyl maleate, agitating the mixture of maleate and acid for at least a half hour at a temperature of at least 70° C., said acid being selected from the group consisting of silicic acid, which contains a maximum of about 3 percent alkali metal and alkaline earth metal ions, and terephthalic acid, and filtering the mixture.

2. A method as defined in claim 1 in which said acid is silicic acid.

3. A method as defined in claim 1 in which said acid is silicic acid which contains less than 0.1 percent of said ions.

4. A method as defined in claim 1 in which the acid is terephathalic acid.

5. A method as defined in claim 1 in which the hydroxyalkyl alkyl maleate is hydroxypropyl buyl maleate.

6. A method as defined in claim 1 in which the initial content of potassium ions is about 2600 parts per million and the treatment removes at least 75 percent of these ions.

7. A method as defined in claim 1 in which said acid is 3.5 to 5 percent by weight of the hydroxyalkyl alkyl maleate.

References Cited

UNITED STATES PATENTS 2,911,434  11/1959  Kocher _____ 260—485

LORRAINE A. WEINBERGER, *Primary Examiner.*

T. L. GALLOWAY, *Assistant Examiner.*